(12) United States Patent
Bergenheim et al.

(10) Patent No.: US 8,955,634 B2
(45) Date of Patent: Feb. 17, 2015

(54) PEDESTRIAN PROTECTION AIRBAG

(71) Applicant: Volvo Car Corporation, Goeteborg (SE)

(72) Inventors: Eddy Bergenheim, Vaestra Froelunda (SE); Tor von Eichwald, Hisings Backa (SE); Gunnar Hallneus, Goeteborg (SE); Mats Erlingfors, Joerlanda (SE)

(73) Assignee: Volvo Car Corporation (SE)

( * ) Notice: Subject to any disclaimer, the term of this patent is extended or adjusted under 35 U.S.C. 154(b) by 99 days.

(21) Appl. No.: 13/686,500

(22) Filed: Nov. 27, 2012

(65) Prior Publication Data
US 2013/0200603 A1 Aug. 8, 2013

(30) Foreign Application Priority Data

Nov. 29, 2011 (EP) ..................................... 11191104

(51) Int. Cl.
B60R 21/36 (2011.01)
B60R 21/2338 (2011.01)
B60R 21/2342 (2011.01)

(52) U.S. Cl.
CPC ............. B60R 21/36 (2013.01); B60R 21/2338 (2013.01); B60R 21/2342 (2013.01); B60R 2021/23382 (2013.01); B60R 2021/23386 (2013.01)
USPC ...................... 180/274; 280/743.2; 280/730.1

(58) Field of Classification Search
CPC B60R 21/36; B60R 21/2338; B60R 21/2342; B60R 2021/23382; B60R 2021/23386
USPC .............................. 280/743.2, 730.1; 180/274
See application file for complete search history.

(56) References Cited

U.S. PATENT DOCUMENTS

| 5,489,119 | A | * | 2/1996 | Prescaro et al. | ........... | 280/743.2 |
| 5,813,696 | A | * | 9/1998 | Hill | ............................. | 280/743.2 |
| 7,134,691 | B2 | * | 11/2006 | Dunkle et al. | ............. | 280/743.2 |
| 7,195,281 | B2 | * | 3/2007 | Williams et al. | ........... | 280/743.2 |
| 7,377,548 | B2 | * | 5/2008 | Bauer et al. | ................ | 280/743.2 |
| 7,584,988 | B2 | | 9/2009 | Okamoto et al. | | |
| 8,016,066 | B1 | * | 9/2011 | Boxey | .......................... | 180/271 |
| 8,262,130 | B2 | * | 9/2012 | Fischer et al. | ............. | 280/743.2 |
| 2004/0074688 | A1 | | 4/2004 | Hashimoto et al. | | |

(Continued)

FOREIGN PATENT DOCUMENTS

| EP | 1997695 A1 | 12/2008 |
| EP | 2502794 A1 * | 9/2012 |

(Continued)

OTHER PUBLICATIONS

European Search Report Dated Apr. 23, 2012, Application No. 11191104.6-1523, Applicant Volvo Car Corporation, 4 Pages.

*Primary Examiner* — Drew Brown
(74) *Attorney, Agent, or Firm* — Brooks Kushman P.C.

(57) ABSTRACT

A pedestrian protection airbag system for a vehicle includes an airbag that is adapted to be deployed along a windscreen and/or A-pillars of the vehicle, is inflatable to a deployed state and has projected periphery. The airbag system further comprises at least one tethering member connecting a first region of the airbag with a second region of the airbag along a path, the path being arranged within the projected periphery of the airbag when the airbag is in the deployed state. A vehicle comprising such a pedestrian protection airbag system and a method of deployment of an airbag of such a pedestrian protection airbag system are also provided.

11 Claims, 6 Drawing Sheets

(56) References Cited

U.S. PATENT DOCUMENTS

2006/0151228 A1 7/2006 Kalliske et al.
2007/0023223 A1 2/2007 Okamoto et al.
2009/0102167 A1 4/2009 Kitte et al.

FOREIGN PATENT DOCUMENTS

EP 2520471 A1 * 11/2012
EP 2548772 A1 * 1/2013

* cited by examiner

PEDESTRIAN PROTECTION AIRBAG

CROSS-REFERENCE TO RELATED APPLICATIONS

This application claims foreign priority benefits under 35 U.S.C. §119(a)-(d) to European patent application number EP 11191104.6, filed Nov. 29, 2011, which is incorporated by reference in its entirety.

TECHNICAL FIELD

The present disclosure relates to a pedestrian protection airbag for a vehicle. The disclosure further relates to a vehicle comprising such a pedestrian protection airbag and a method of deployment of such a pedestrian protection airbag.

BACKGROUND

If a vehicle, such as a car, is involved in an accident, in which the front part of the vehicle hits a pedestrian or a cyclist, the pedestrian/cyclist may be thrown towards the windscreen and/or the A-pillars. In order to reduce the severity of these accidents, it is well-known to use an inflatable pedestrian protection airbag, which deploys and at least partly covers the windscreen and/or the A-pillars, so that the pedestrian/cyclist instead hits the softer airbag.

During normal conditions, the airbag is stored in a housing under the bonnet of the vehicle. However, when a sensor system in the vehicle detects a potential collision risk with for example a pedestrian or cyclist, the airbag is deployed, i.e., inflated, in order to at least partly cover the windscreen and/or the A-pillars.

Document US 2006/0151228 A1 discloses a pedestrian protection airbag system for protecting pedestrians and cyclists. The airbag is deployable to protect a pedestrian or a cyclist who impacts with the vehicle. To prevent the lateral displacement of the segments of the deployed airbag in front of the A-pillars of the vehicle, the airbag, which is deployed from a housing below the bonnet, includes a section or a chamber near the hinges of the bonnet. As a result, the airbag is deployable above the bonnet along the entire width of the vehicle in front of the lower area of the windscreen and the A-pillars. The lateral ends of the airbag extend over the A-pillars in such a way that they are upwardly oriented and are additionally fixed by a tethering member in the form of a strap after deployment. A number of embodiments disclose various arrangements of the tethering members, e.g., connecting an upper corner of the airbag to the bonnet or to the housing.

However, the suggested airbag of US 2006/0151228 A1 has a rather complex shape, in particular due to the section or chamber near the hinges of the bonnet. In addition, the illustrated tethering members risk getting tangled during deployment. There is also a risk that an impacting pedestrian/cyclist can get tangled in the tethering member and be injured by the tethering member.

SUMMARY

An object of the present disclosure is to overcome or ameliorate at least one of the disadvantages of the prior art, or to provide a useful alternative.

It is desirable to provide a less complex pedestrian protection airbag as compared to pedestrian protection airbags used today, which airbag yet can reduce the risk for sideways displacement of the airbag. It is especially desirable that the airbag should stay in place, even if the pedestrian/cyclist impacts from an oblique angle with respect to the windscreen of the vehicle.

It is further desirable to reduce the risk that an impacting pedestrian/cyclist can get tangled and possibly injured by a tethering member used to maintain the deployed airbag in place.

In a first aspect of the present disclosure, there is provided a pedestrian protection airbag for a vehicle. The airbag is adapted to be deployed along a windscreen and/or A-pillars of the vehicle, is inflatable to a deployed state and has a projected periphery. The airbag comprises at least one tethering member connecting a first region of the airbag with a second region of the airbag along a path, the path being arranged within the projected periphery of the airbag when in the deployed state.

The term projected periphery of the airbag relates to when the airbag, in its deployed state, is projected to a plane forming a main plane of the windscreen of the vehicle. The projected periphery is thus substantially a 2-dimensional feature. For many pedestrian protection airbags, a peripheral seam of the airbag substantially coincides, at least partly, with the projected periphery.

The term path, as used in this disclosure, relates to the airbag in the deployed state and describes the path along which the tethering member extends when the airbag is in its deployed state. During normal conditions, the airbag is stored in a housing below a bonnet of the vehicle. The bonnet is in American English often called the hood.

The path is herein used to define the active part of the tethering member, i.e., the part forming an effective length of the tethering member. Preferably both ends of the tethering member are attached to the airbag, such that the full length of the tethering member forms an effective length making up the path. However, in some cases the tethering member may not be attached at its end, but a distance away from the end, such that there is a loose end. In that case, the loose end will be inactive as regards stabilizing the deploying/deployed airbag, and thus the loose end does not form part of the path.

As further described below, the at least one tethering member may extend inside the airbag or along the outer surface of the airbag. In any case, according to the disclosure, the path does not extend outside the projected periphery of the airbag. Hence, the tethering member of the proposed disclosure, does not extend in the free air between two portions of the airbag, as disclosed in US 2006/0151228 A1, wherein a strap is shown to extend between an upper corner of the airbag and an upper edge of the central region. Such a strap is attached at its ends to the airbag, but extends for essentially its whole length in the free air outside the projected periphery of the airbag, when the airbag is deployed. The strap of US 2006/0151228 A1 neither extends inside of the airbag, nor along the outer surface of the airbag.

Moreover, since the path is arranged within the projected periphery of the airbag, the tethering member does not extend to an attachment position outside of the airbag, such as a housing for the pedestrian protection airbag located below the bonnet of the vehicle, the bonnet itself, a location in an engine compartment or in a plenum area of the vehicle.

The pedestrian protection airbag may form part of a pedestrian protection airbag system, which optionally may contain at least one external stabilization member, connecting the airbag to any of the above-mentioned positions outside of the airbag. Such external stabilization members are known by the skilled person and will not be discussed in any further detail herein. Further, such an external stabilization member extending at least partly outside of the projected periphery of the airbag should be distinguished from the tethering member forming part of this disclosure, which extends within the projected periphery of the airbag.

When the path of the tethering member is located within the projected periphery the airbag, as in the pedestrian protection airbag of this disclosure, the integration of the pedestrian protection airbag in the vehicle is made easier as compared to a conventional pedestrian protection airbag. The pedestrian protection airbag according to the disclosure is further easier to pack in a housing and easier to mount in a vehicle than a conventional pedestrian protection airbag, due to the localization of the tethering member. The tethering member of this disclosure may further be useful during deployment of the airbag in order to control the process of deployment.

In case the pedestrian/cyclist impacts with the airbag, and especially if he/she hits at an oblique angle relative to the windscreen, the tethering member will help to keep the airbag in the intended position, wherein it at least partly covers the windscreen and/or the A-pillars of the vehicle. If no tethering member was used, the airbag would risk being pushed out of position.

The tethering member of the disclosure may be made shorter than tethering members of prior art, e.g., as in US 2006/0151228 A1. They are therefore cheaper to produce and easier to handle during manufacturing and during mounting.

By using the tethering member according to the disclosure, the risk that the tethering member is tangled during deployment of the airbag, e.g., in a wiper arm, is reduced as compared to prior art tethering members. Further, the risk that an impacting pedestrian/cyclist gets tangled in the tethering member and thereby is injured is also reduced.

Due to the reduced risk of damage to the tethering member as compared to a conventional tethering member, a simpler construction, weaker material and/or less material may be used, resulting in less weight and/or reduced cost.

The terms front, rear and lateral used herein refer to the vehicle seen from the position of a driver. Further, terms regarding the airbag, like upper corner, upper region, upper edge, lower region, lower edge, left-hand, right hand etc., as well as percentage measures of the airbag, refer to the airbag in its deployed state.

The first region of the airbag may be an upper region, and the second region of the airbag may be a lower region. The upper region of the airbag is defined as the region of the deployed airbag situated above an imaginary line L in lateral direction going through the deployed airbag at half of its height h along the windscreen at a centre line. The lower region is defined as situated below the imaginary line L. The centre line divides the airbag in a right-hand and a left-hand half. The halves are commonly mirror-images of each other.

Any number of tethering members may be used, such as one, two, three, four or five. For symmetry reasons, it is generally preferred to use the same number of tethering members for the left-hand half and the right-hand half of the airbag, but the number may also differ between the halves. When using two or more tethering members at one half of the airbag, the attachment points may vary between the tethering members for one or both ends of the tethering members.

Suitable materials for the tethering members are textile, plastics and/or metal wire. The tethering member is preferably a belt or a strap. It may be of the same material as the airbag itself and may be made as an integral unit with the main part of the airbag.

The pedestrian protection airbag may be sold and used as a spare part, or as part of a vehicle.

In an embodiment, the at least one tethering member has a first end and a second end and both ends are attached to the airbag. Thereby, the full length of the tethering member forms the path and loose ends are avoided.

At least one end of the tethering member may be attached at or adjacent to the projected periphery of the airbag, e.g., at a lower or upper edge. Further, by attaching the tethering member at or adjacent to the projected periphery, it may get a maximal extension within the projected periphery of the airbag in that particular section of the airbag. The end may be attached in a peripheral seam of the airbag. Thereby the attachment may be done when making the peripheral seam. The term seam is herein used to include actual seeming, but also other joining technologies such as welding or gluing.

The at least one tethering member may comprise a tear seam attaching the at least one tethering member to itself or to the airbag. The tear seam may be designed such that it tears at a desired selectable applied force. The tear seam may provide a means for controlling the active length of the tethering member, e.g., by forming a loop of the tethering member, such that when the tear seam is intact the tethering member has a certain length, and when the tear seam is torn, the tethering member will have another, more extended active length. In addition, the tear seam may be used to control the shape of the airbag during deployment, by successively inflating different portions of the airbag.

In an embodiment the at least one tethering member is arranged inside of the airbag. It thus extends through the interior of the airbag. The tethering member may then contribute to form the shape of the airbag both during deployment and when deployed, giving the airbag a more stable shape. For this purpose, the tethering member may be pre-tensioned. By extending internally within the airbag, the tethering member may take the shortest way between its attachment points. As a comparison, a tethering member extending externally follows the curved outer surface of the deployed airbag.

When extending inside the airbag, the tethering member is protected from the environment. This reduces the risk that the tethering member is damaged during deployment or when packing the airbag into the housing. The reduced risk of damage makes it possible to make the tethering member simpler, lighter and cheaper than a conventional tethering member. The risk that the impacting pedestrian/cyclist will get tangled and possibly injured by the tethering member is avoided, when the tethering member only extends internally within the airbag.

The at least one tethering member may be attached to the interior of the airbag at at least one additional location being different from the projected periphery of the airbag. Thereby the deployment process may be controlled by influencing the successive shape of the inflating airbag, e.g., at which moment during the deployment process the corner portions are to be inflated.

The at least one tethering member may be attached to the interior of the airbag at the at least one additional location by means of at least one tear seam. The tethering member may in addition, or as an alternative, comprise a tear seam attaching the tethering member to itself By controlling at which moment during deployment the tear seam is torn, the inflation process can be controlled. A tethering member may comprise one or more tear seams. There may be a plurality of tethering members comprising tear seams. The tear seams may be arranged to tear at different moments, thereby controlling the shape of the airbag during deployment. This may help to prevent the deploying airbag from interfering with the housing, wipers, bonnet, bonnet hinges etc.

The tear seams may be arranged such that at first only a first portion of the airbag is inflated, resulting in a good expansion out of the housing. Thereafter, the tear seam tears, and the airbag extends to its final deployed shape. By using this kind of arrangement, it is possible for the protective action of the lower region of the airbag to be reached in a quicker way as compared to a normal airbag deployment process, since the lower region reaches its working pressure in less time. This arrangement may be used both for tear seams attaching the tethering member to itself, as well as for tear seams attaching the tethering member to the airbag, or a combination of such tear seams. The deployment process may also be performed in a plurality of steps inflating successive portions of the airbag.

As an alternative to the internal tethering member being arranged inside of the airbag, or as a complement, the at least one tethering member may be arranged along the outer surface of the airbag. Such a tethering member anyway extends within the projected periphery of the airbag. It may be used to control the shape of the airbag by influencing its curvature.

Such a tethering member may be attached to the outer surface of the airbag at at least one additional location being different from the projected periphery of the airbag. It may be attached at one, two, three, four or more extra locations, e.g., by at least one distinct attachment means, such as a tab, a strap a loop or a Velcro-type attachment. Alternatively, or as a complement, the tethering member may be at least partly continuously attached along the outer surface of the airbag, e.g., by being glued.

The at least one tethering member may be arranged from an upper corner of the airbag to a lower edge of the airbag or from an upper edge of a central region to a lower corner of the airbag. The central region is defined as the region covering the windscreen, while the upper corners are substantially located over or adjacent to the A pillars.

The at least one tethering member may extend over less than half the width of the airbag, preferably less than 40% and most preferably less than 30%. Thereby the tethering member can be made relatively short as compared to known tethering members.

In a second aspect of the present disclosure there is provided a pedestrian protection airbag system comprising the above-mentioned pedestrian protection airbag and the housing adapted to store the airbag. The housing is further adapted to be located below a bonnet of the vehicle. The pedestrian protection airbag system may be sold and used as a spare part.

In a third aspect of the present disclosure there is provided a vehicle comprising the above-mentioned pedestrian protection airbag or pedestrian protection airbag system.

In a fourth aspect of the present disclosure there is provided a use of at least one tethering member as described above for stabilization of a deploying/deployed pedestrian protection airbag. The at least one tethering member may further be used for preventing sideways swaying of the deployed airbag.

In a fifth aspect of the present disclosure there is provided a method of deployment of a pedestrian protection airbag along the windscreen and/or A-pillars of a vehicle. The airbag has a projected periphery, is inflatable to a deployed state and comprises at least one tethering member, connecting a first region of the airbag with a second region of the airbag along a path, the path being arranged within the projected periphery of the airbag, when in the deployed state, wherein the shape of the airbag is controlled during the deployment process by means of the at least one tethering member, which may be pre-tensioned.

In addition, the tethering member may comprise at least one tear seam connecting the at least one tethering member to the airbag and/or to itself, the method comprises the following steps for controlling the shape of the airbag during the deployment process:

a) inflating a first portion of the airbag, the first portion being restricted by the at least one tethering member,
b) tearing the at least one tear seam,
c) inflating a following portion of the airbag.

The at least one tear seem is thus used to control the order in which different portions of the airbag are inflated. By controlling at which moment during deployment the tear seam is torn, the inflation process can be controlled.

The inflation of a first portion of the airbag results in a good expansion out of the housing. Thereafter the tear seam/s may tear, and the airbag may extend to its final deployed shape. By using this kind of arrangement, the protective action of the lower region of the airbag may be reached in a quicker way as compared to a normal airbag deployment process, since the lower region reaches its working pressure in less time. This arrangement may be used both for tear seams being part of the tethering member, as well as for tear seams attaching the tethering member to the interior of the airbag, or a combination of such tear seams. The deployment process may also be performed in a plurality of steps inflating successive portions of the airbag.

BRIEF DESCRIPTION OF THE DRAWINGS

Embodiments according to the present disclosure will hereinafter be described in greater detail by means of non-limiting examples and with reference to the appended drawings wherein.

It should be noted that the appended drawings are not necessarily drawn to scale and that the dimensions of some features of the present disclosure may have been exaggerated for the sake of clarity.

DETAILED DESCRIPTION

Example embodiments are set forth in the following description. It should be realized, however, that the embodiments are included in order to explain principles of the disclosure and not to limit the scope of the disclosure defined by the appended claims. Furthermore, details from two or more of the embodiments may be combined with each other.

Figure 1:
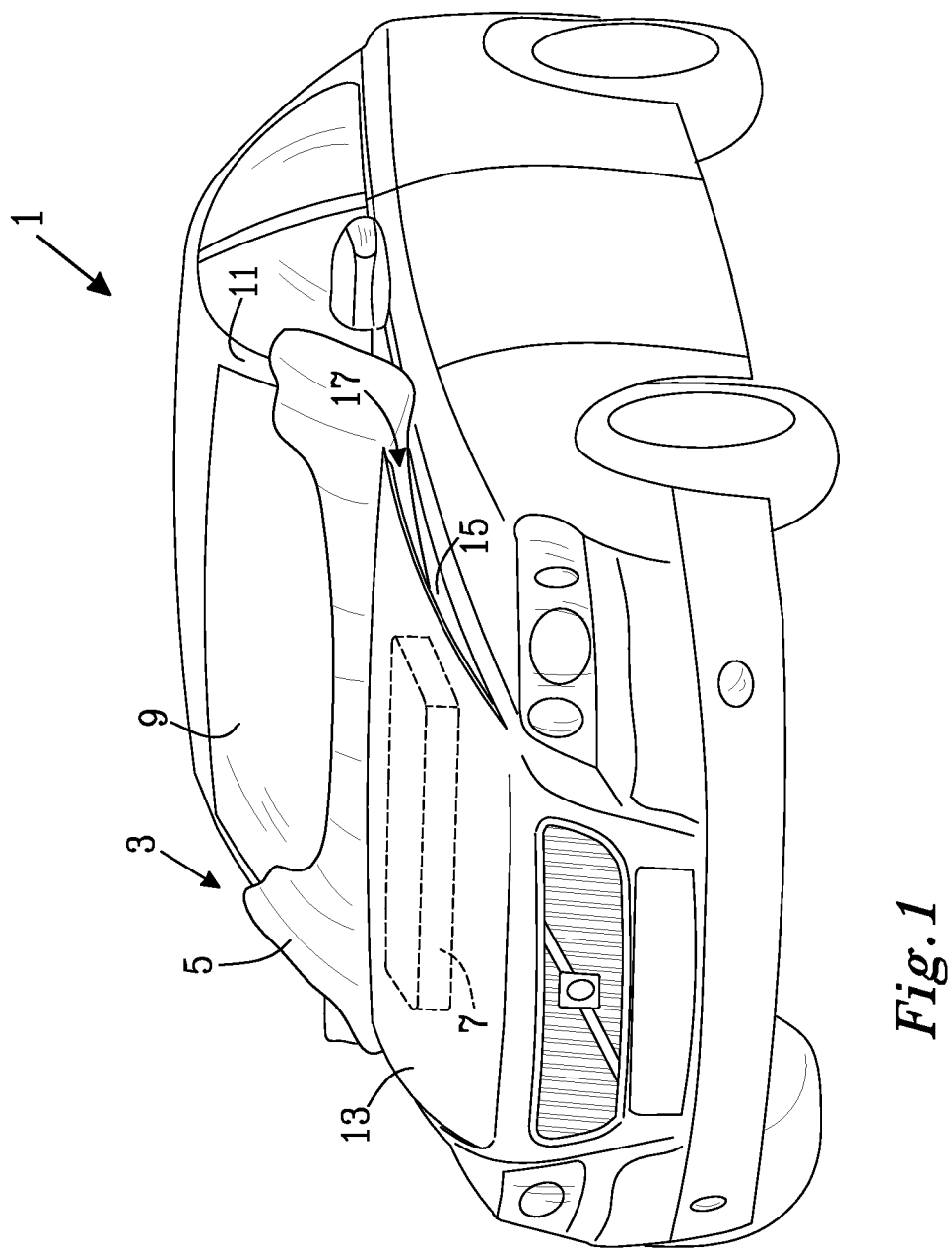
FIG. 1 is a schematic overview of a vehicle equipped with a pedestrian protection airbag according to a first embodiment of the disclosure after deployment of the airbag.

FIG. 1 is a schematic overview of a vehicle 1 equipped with a pedestrian protection airbag system 3 comprising a pedestrian protection airbag 5 according to a first embodiment of the disclosure. The airbag 5 is stored in a housing 7 during normal conditions. However, when a sensor system (not illustrated) in the vehicle detects a potential collision risk with for example a pedestrian or cyclist, the airbag 5 is deployed, i.e., inflated to a deployed state, as seen in the FIG. 1. The purpose of the deployed airbag is to prevent the pedestrian/cyclist from directly hitting the windshield or windscreen 9 and/or the A-pillars 11 of the vehicle. Instead the pedestrian/cyclist impacts with the much softer airbag. Moreover, the same sensor system may also be used to initiate a deployment of the bonnet 13, i.e., rising the rear end of the bonnet 13. Thereby a clearance is provided between the bonnet 13 and the engine compartment 15, which also helps to minimize the impact forces on the pedestrian/cyclist. The airbag may deploy through the rear bonnet opening 17, which results from raising the rear end of the bonnet 13.

Figure 2:
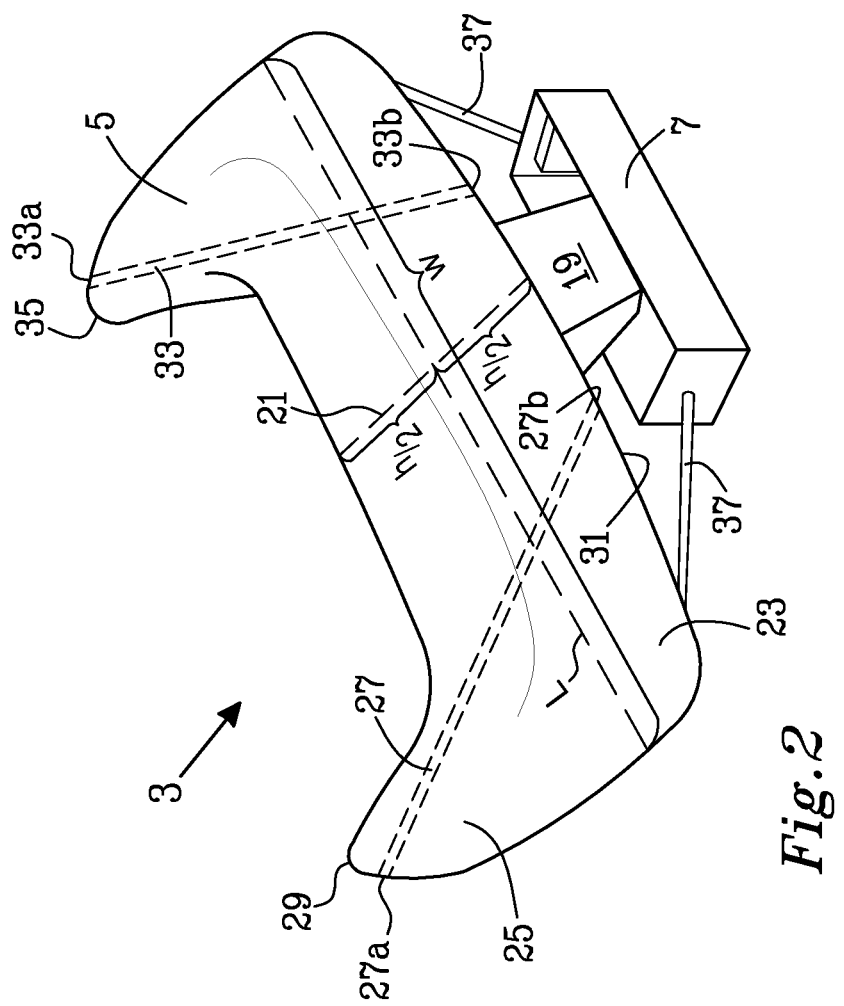
FIG. 2 illustrates the pedestrian protection airbag of FIG. 1.

In FIG. 2, a more detailed view of the pedestrian protection airbag system 3 according to the first embodiment of the disclosure is illustrated with the airbag 5 in its deployed state. The deployed airbag 5 is connected to the housing 7 by means of an inflation channel or inflating channel 19, through which the airbag 5 can be inflated. The deployed airbag 5 has a lateral extension w. A centre line 21 divides the airbag 5 in a right-hand and a left-hand half. The halves are commonly mirror-images of each other, as in FIG. 2. A lower region 23 is defined as the region of the deployed airbag 5 situated below an imaginary line L in lateral direction going through the deployed airbag 5 at half of its height h along the windscreen at the centre line 21. An upper region 25 is defined as the region of the deployed airbag 5 situated above the imaginary line L. The imaginary line L may coincide with the largest lateral extension w, as in FIG. 2, but the largest lateral extension w may also be at another height.

FIG. 2 further illustrates that a tethering member 27, here in the form of a strap, extends from an upper right-hand corner 29 to a lower edge 31 at the projected periphery of the airbag 5. A first end 27a is attached to the airbag adjacent to the projected periphery of the airbag 5 at the upper right-hand corner 29. A second end 27b is attached adjacent to the projected periphery of the airbag 5 at the lower edge 31. In the same way, another tethering member 33 extends from an upper left-hand corner 35 to the lower edge 31 of the airbag 5, having its ends 33a, 33b attached adjacent to the projected periphery of the airbag 5, e.g., attached in a peripheral seam. The tethering members 27, 33 extend over less than half of the width w of the airbag 5. As can be seen from FIG. 2, the tethering members 27, 33 are arranged inside of the airbag 5. Thereby there is no risk that the impacting pedestrian/cyclist would get tangled in the tethering members 27, 33.

In case the pedestrian/cyclist impacts with the airbag 5, and especially if he/she hits at an oblique angle relative to the windscreen of the vehicle, the tethering members 27, 33 will help to keep the airbag 5 in the intended position, wherein it at least partly covers the windscreen 9 and/or the A-pillars 11 of the vehicle. If no tethering members 27, 33 were used, the airbag 5 would risk being pushed out of position. The tethering members 27, 33 are further useful during deployment of the airbag 5 in order to control the process of the deployment, e.g., guiding the shape of the deploying airbag.

In the illustrated embodiment, external stabilization members 37, not being part of the disclosure, are attached between the lower edge 31 of the airbag 5 outside of the inflating channel 19 and the housing 7. Alternatively, the lower edge 31 of the airbag 5 may be connected to the bonnet, the plenum area or to a location in the engine compartment via the external stabilization members 37. Such external stabilization members 37 are known by the skilled person and will not be discussed in any further detail herein.

Figure 3:
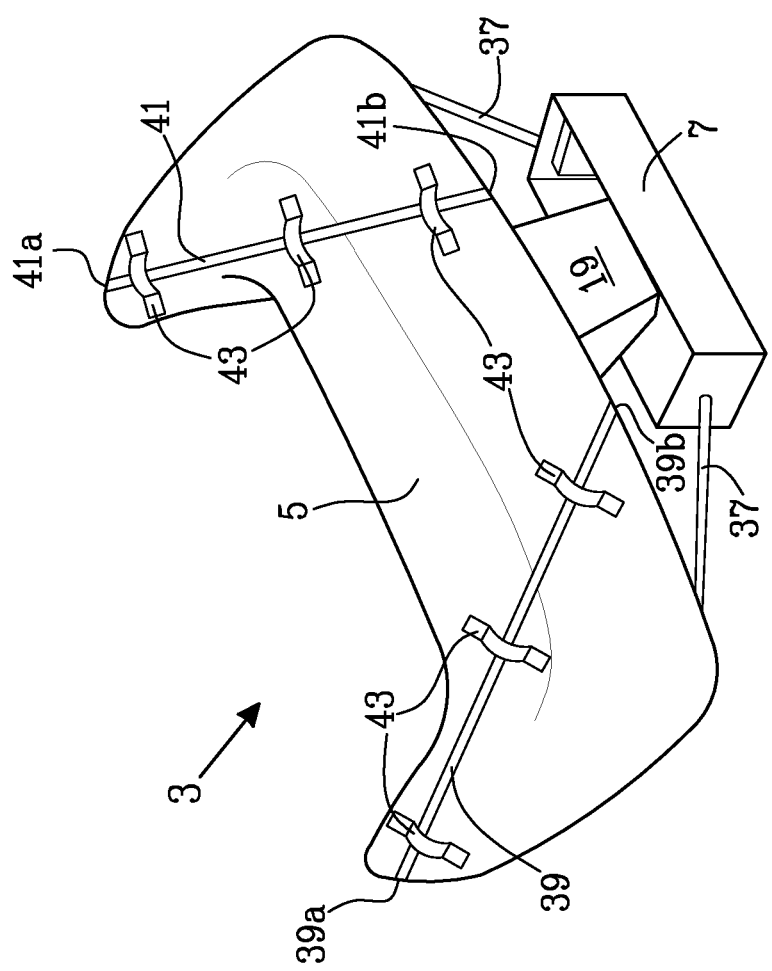
FIG. 3 illustrates a pedestrian protection airbag according to a second embodiment.

FIG. 3 illustrates a second embodiment of the disclosure, in which tethering members 39, 41 instead are arranged along the outer surface of the airbag 5. In the illustrated embodiment, the tethering members 39, 41 are attached to the outer surface of the airbag 5 by means of at least one distinct attachment device or means, such as a tab 43, strap or loop. As an alternative or a complement, the tethering members 39, 41 may be at least partly continuously attached along the outer surface of the airbag 5, e.g., by being glued. In addition to these attachments along the outer surface, the ends 39a, 39b; 41a, 41b of the tethering members 39, 41 are attached adjacent to the projected periphery of the airbag, e.g., in the peripheral seam.

Figure 4:
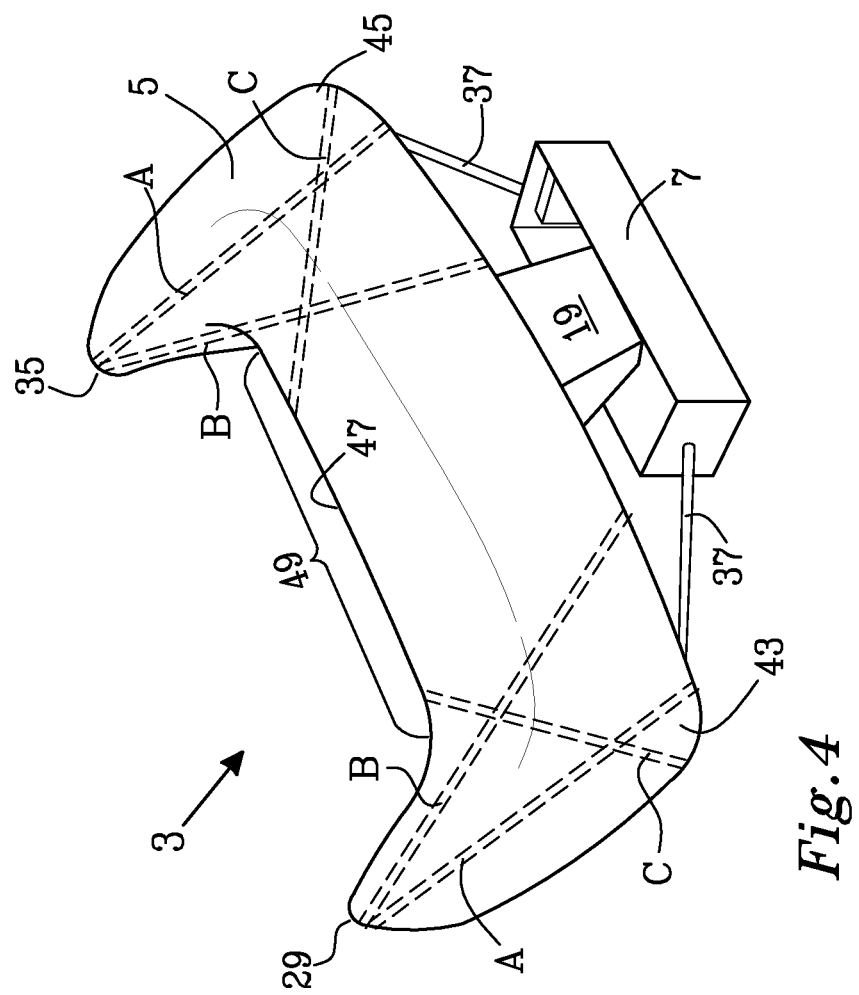
FIG. 4 illustrates some possible positions for a path of a tethering member.

FIG. 4 illustrates a number of possible paths for tethering members:

A: connecting an upper corner 29, 35 to the lower edge adjacent to a lower corner 43, 45;

B: connecting an upper corner 29, 35 to the lower edge in the vicinity of the inflating channel 19, as in FIGS. 2 and 3;

C: connecting a lower corner 43, 45 with an upper edge 47 of the central region 49.

The central region is defined as the region covering the windscreen 9, while the upper corners 29, 33 are substantially located over or adjacent to the A pillars.

One or more of these paths may be used. Any number of tethering members may be used, such as one, two, three, four or five. For symmetry reasons, it is generally preferred to use the same number of tethering members for each half of the airbag, but the number may also differ. The tethering member may extend over less than half the lateral width w of the airbag, preferably less than 40% and most preferably less than 30%.

The ends of tethering members are preferably attached at the projected periphery of the airbag, most preferably in the peripheral seam, but can be attached at any location of the airbag. Therefore, there are in principle an endless number of different paths of the tethering member available.

The tethering member according to the disclosure may further be used in order to control the shape of the airbag 5 during a deployment process. Examples are illustrated by FIGS. 5a, 5b and 6a, 6b.

Figure 5A:
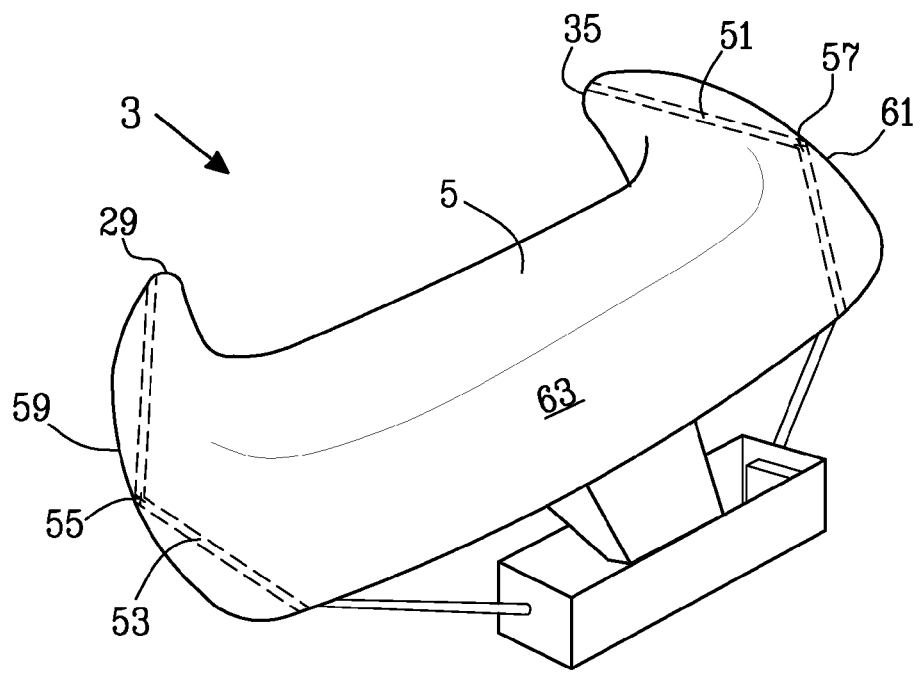
FIGS. 5a and 5b illustrate a pedestrian protection airbag according to a third embodiment.
Figure 5B:
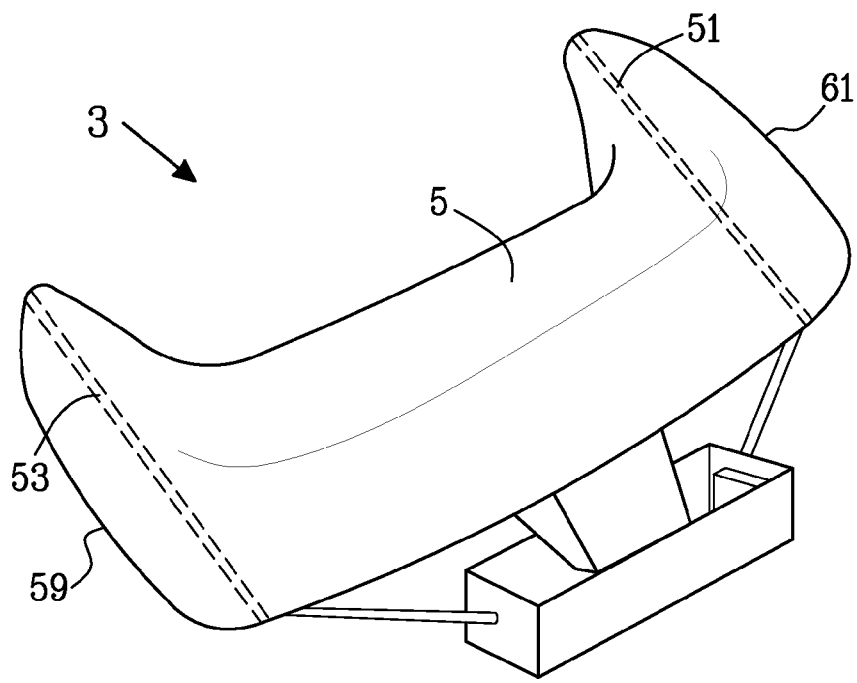

In FIGS. 5a and 5b a third embodiment of the disclosure is shown, wherein the tethering members 51, 53 extend inside of the airbag 5. They are, in addition to being attached at the ends, also attached at an additional location at the interior of the airbag 5 by a tear seam 55, 57, in this case adjacent to a lateral edge 59, 61 at the projected periphery of the airbag 5. The tear seams are designed to tear at a desired selectable applied force. In a first phase during the deployment process, a first portion 63 of the airbag is inflated, as illustrated in FIG. 5a. The first portion 63 is restricted since the upper corners 29, 35 are restrained by the tethering members 51, 53, which during this phase still are attached to the interior of the airbag 5. At a desired selectable force, being applied to the tethering members 51, 53 by the inflating airbag, the tear seams 55, 57 are torn and the airbag 5 expands further to its full deployed volume as in FIG. 5b. The upper corners 29, 35 are then raised to respective positions, wherein they are located at least partly over or close to the A-pillars of the vehicle.

Even if FIGS. 5a and 5b disclose tethering members 51, 53 extending inside of the airbag 5, it would also be possible to use a tear seam for a tethering member extending along the outer surface of the airbag 5. The tear seam would then be located on the exterior of the airbag 5.

Figure 6A:
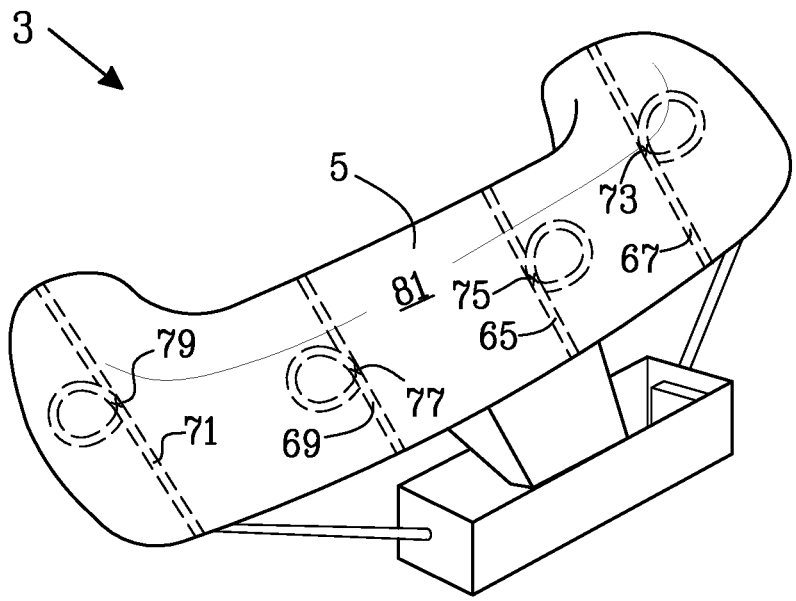
FIGS. 6a and 6b illustrate a pedestrian protection airbag according to a fourth embodiment.
Figure 6B:
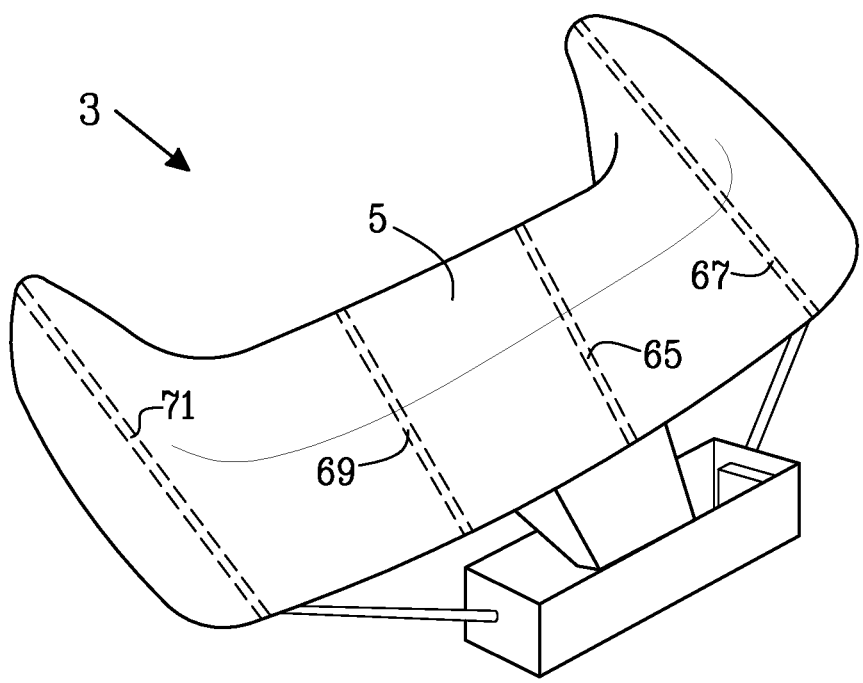

FIGS. 6a and 6b illustrate a fourth embodiment of the disclosure. Tethering members 65, 67, 71, 79 comprise a tear seam 73, 75, 77, 79 attaching each tethering member to itself at a location somewhere in between the ends. In a first phase during the deployment process, a first portion 81 of the airbag is inflated, as illustrated in FIG. 6a. The first portion 81 is restricted by the tethering members 65, 67, 69, 71, which during this phase still are attached to themselves. At a desired selectable force, being applied to the tethering members 65, 67, 69, 71 by the inflating airbag, the tear seams 73, 75, 77, 79 are torn and the airbag 5 expands further to its full deployed volume as in FIG. 6b. The tethering members 65, 67, 69, 71 may extend inside of the airbag 5, as illustrated, or along the outer surface of the airbag 5. Even if FIGS. 6a and 6b illustrate four tethering members, any number, such as one, two, three or more may be used. Moreover, the force at which the tear seam breaks may be selected individually for each tear seam, in order to control the deployment process of the airbag in greater detail.

Further modifications of the embodiments described in the disclosure within the scope of the appended claims are feasible. As such, the present disclosure should not be considered as limited by the embodiments and figures described herein. Rather, the full scope of the disclosure should be determined by the appended claims, with reference to the description and drawings.

What is claimed is:

1. A pedestrian protection airbag system for a vehicle, the pedestrian protection airbag system comprising:
   an airbag adapted to be deployed along a windscreen and/or A-pillars of the vehicle and being inflatable to a deployed state, the airbag having a peripheral seam;
   a tethering member arranged at least partially along an outer surface of the airbag and having opposite ends that are attached to the airbag in the peripheral seam of the airbag; and
   a strap attached to the outer surface of the airbag, the strap receiving a portion of the tethering member disposed between the ends of the tethering member such that the strap attaches the portion of the tethering member to the outer surface of the airbag.

2. The pedestrian protection airbag system according to claim 1 wherein the tethering member comprises a tear seam that attaches the tethering member to itself or to the airbag.

3. The pedestrian protection airbag system according to claim 1 wherein the tethering member is at least partially continuously attached along the outer surface of the airbag.

4. The pedestrian protection airbag system according to claim 1 wherein the tethering member is arranged from an upper corner of the airbag to a lower edge of the airbag.

5. The pedestrian protection airbag system according to claim 1 wherein the tethering member is arranged from an upper edge of a central region of the airbag to a lower corner of the airbag.

6. The pedestrian protection airbag system according to claim 1 wherein the airbag has a projected periphery in the deployed state, and the opposite ends of the tethering member connect first and second regions of the airbag along a path that is arranged within the projected periphery of the airbag when the airbag is in the deployed state.

7. A vehicle comprising:
   a windscreen;
   A-pillars positioned on sides of the windscreen; and
   a pedestrian protection airbag system including an airbag adapted to be deployed along the windscreen and/or the A-pillars and being inflatable to a deployed state, and a tethering member connecting a first region of the airbag with a second region of the airbag, wherein the airbag has a peripheral seam, and the tethering member has opposite ends that are attached to the airbag at the peripheral seam, and wherein the airbag system further includes a strap attached to an outer surface of the airbag, the strap receiving a portion of the tethering member disposed between the ends of the tethering member such that the strap attaches the portion of the tethering member to the outer surface of the airbag.

8. The vehicle of claim 7 wherein the airbag has a projected periphery in the deployed state, and the tethering member connects the first region of the airbag with the second region of the airbag along a path that is arranged within the projected periphery of the airbag when the airbag is in the deployed state.

9. A method of deployment of a pedestrian protection airbag, the method comprising:
   inflating the airbag such that the airbag deploys along a windscreen and/or A-pillars of a vehicle to a deployed state; and
   controlling shape of the airbag during deployment with a tethering member that connects a first region of the airbag with a second region of the airbag;
   wherein the airbag has a peripheral seam, and the tethering member has opposite ends that are attached to the airbag at the peripheral seam, and wherein a portion of the tethering member disposed between the ends is attached to an outer surface of the airbag with a strap that is disposed on the outer surface of the airbag.

10. The method of claim 9 wherein the tethering member comprises at least one tear seam connecting the tethering member to the airbag and/or to itself, and wherein the method is performed to include the following:
   a) inflating a first portion of the airbag, the first portion being restricted by the tethering member;
   b) tearing the at least one tear seam; and
   c) inflating an additional portion of the airbag.

11. The method of claim 9 wherein the airbag has a projected periphery in the deployed state, and the tethering member connects the first region of the airbag with the second region of the airbag along a path that is arranged within the projected periphery of the airbag when the airbag is in the deployed state.

* * * * *